Sept. 29, 1942.   K. K. KÜHNE   2,297,483
ELASTIC CONNECTING LINK
Filed Dec. 31, 1940
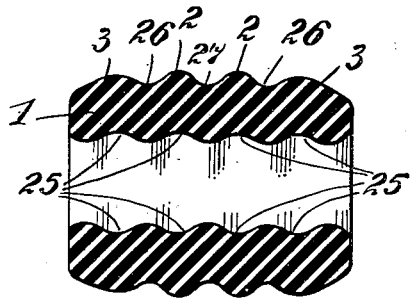
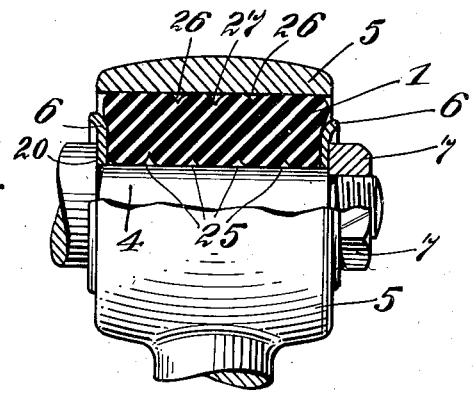
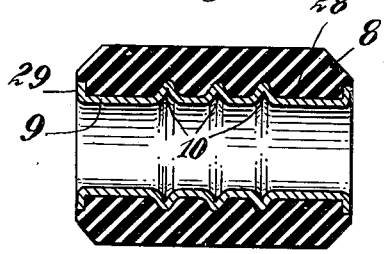
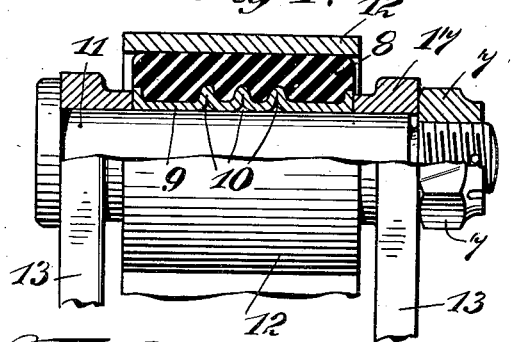
INVENTOR.
Kurt Karl Kühne
BY C. P. Goepel
his ATTORNEY Patented Sept. 29, 1942

2,297,483

UNITED STATES PATENT OFFICE 2,297,483

ELASTIC CONNECTING LINK

Kurt Karl Kühne, Hanover, Germany; vested in the Alien Property Custodian

Application December 31, 1940, Serial No. 372,638
In Germany December 28, 1939

1 Claim. (Cl. 287—85)

This invention relates to elastic links, and more particularly to the elastic sleeves used therein. Such elastic links are used in connection with wheel carrying arms or plate spring members on vehicles.

One object of the invention is to provide a sleeve of rubber or the like, which may be readily applied and when applied, partakes of the desired and most efficient form.

The invention consists of an elastic link formed of a rubber sleeve of practically cylindrical shape having a central bore, the inner or outer surface of the sleeve having a wave-like contour with the peaks of the waves highest in the central part tapering towards each end. The contour is wave-like, with the wave length shorter in the central part than at the ends. The projecting wave lengths are compressible longitudinally against each other, and press against an axially disposed metal enclosing member. Finally, the corrugations in the metal enclosure are in proximity to the ends thereof.

The invention will be further described, embodiments thereof shown in the drawing and the invention will be finally set forth in the claim.

In the accompanying drawing,

Fig. 1 is a longitudinal central section of the improved rubber sleeve in its normal or initial condition, ready to be applied;

Fig. 2 is a longitudinal central section of a linkage, with the rubber sleeve disposed therein, and showing the same in longitudinally compressed condition;

Fig. 3 is a longitudinal central section, of a different form of sleeve, applied to an interior sleeve having a wave-like conformation, the metal sleeve being capable of being longitudinally compressed, together with the rubber sleeve;

Fig. 4 is a linkage with the device shown in Fig. 3 disposed therein, in longitudinally compressed position, and Fig. 5 is a longitudinal section of another form of device such as that shown in Fig. 3.

Similar characters of reference indicate corresponding parts throughout the various views.

Referring to the drawing and more particularly to Figures 1 and 2, there is shown in Figure 2, a linkage consisting of the well known parts 4, 5, 6 and 7, the part 4 being a connector, part 5, an exterior circumferential member, the part 6, lateral and curved guides, movable longitudinally on the connector 4, the parts 6 being washer like, with a central bore, and the part 7 being a nut-like device.

Adjacent the connector is a shoulder 20, against which one of the washers 6 rests, the washer having its bore of about the same diameter as that of the connector.

Disposed between the inner surface of the outer member 5 and the outer surface of the connector or shaft 4, is the improved rubber sleeve 1, shown in Fig. 2, but in compressed condition. This improved rubber sleeve 1 is shown in expanded condition, that is the normal condition before its application to the linkage, in Figure 1.

It consists of a generally cylindrically shaped member 1, having a wave-like interior surface forming a bore and a wave-like exterior surface. These waves, both interior and exterior, are arranged longitudinally. At the exterior the waves are shorter in wave length at the center, and longer at the ends, the center waves 2 being higher than the end waves 3. That is, the diameter of the waves 2 is larger than the diameter of the waves 3. Disposed between the waves are the valleys 25 for the bore waves and 26 and 27 for the exterior waves. When the sleeve is applied to the linkage, the valleys 25, and the waves 26 and 27 are compressed together, as shown in Fig. 2.

An insert as shown in Figure 1 may be provided with an interior thin sheet metal sleeve having waves and the valleys 10. The interior bore 28 of the rubber piece 8 of Fig. 3, would have the same kind of waves, so as to be in registration therewith. The thin sheet metal sleeve is of such thin metal that it may be readily longitudinally compressed. The sleeve 9 has enclosing end pieces 29 extending only partially along the ends of the rubber. In Figure 4 is shown the improved device shown in Figure 3, but applied to the linkage and in longitudinally compressed condition.

Finally, another embodiment is shown in Fig. 5, wherein the thin sheet metal sleeve 9a has a rubber sleeve 8, but the waves are so arranged that there are two central higher waves 30, then one lower at each side of this pair, namely, 31 and 32, and finally spaced therefrom longitudinally two others, 33 and 34. Both the metallic sleeve and the rubber sleeve are longitudinally compressible. In the embodiments of Figs. 3 and 5, the rubber and metal are securely fastened together.

In Fig. 4, outer part 12 has a slightly different shape than the part 5 shown in Fig. 2, the nut 7 acts upon intermediate member 17, which is pushed in by the nut, and standards 13 are provided.

It will be noted that the improvement consists in the wave-like configuration of the rubber sleeve, whether placed on a metal sleeve or otherwise.

I have described various embodiments of my invention, but changes may be made without departing from the spirit of my invention, as defined by the appended claim.

What is claimed is:

In an elastic connecting link having spaced cylindrical concentric members having smooth uninterrupted walls enclosing therebetween an elastic sleeve, having an outer and an inner wall, the combination with the outer wall of the sleeve formed with a contour having peaks and valleys so disposed that the amplitude of the central wave is greater than the amplitudes of the waves at each side thereof and that the wave length of lateral waves are longer than that of the central wave, of the inner wall of the sleeve formed with a contour of peaks and valleys so disposed that radially inwards of a peak of the outer wall, a valley of the inner wall is disposed, and radially inwards of a valley of the outer wall, a peak of the inner wall is disposed, and means for compressing the elastic sleeve from each end of the elastic sleeve longitudinally from the ends to the center of the sleeve for closing the valleys of the contours of the inner and outer walls, and bringing the peaks adjacent each other.

KURT KARL KÜHNE.